United States Patent [19]
Erath

[11] 3,863,147
[45] Jan. 28, 1975

[54] CAPACITANCE SENSING APPARATUS

[75] Inventor: Louis W. Erath, Houston, Tex.

[73] Assignees: Owen F. Jensen, III; Owen F. Jensen, Jr., both of Houston, Tex. ; a part interest to each

[22] Filed: Feb. 16, 1973

[21] Appl. No.: 333,025

[52] U.S. Cl. .......... 324/60 CD, 73/304 C, 324/61 R
[51] Int. Cl. ....................... G01r 11/52, G01r 27/26
[58] Field of Search .......... 324/61 C, 60 C, 60 CD, 324/61 R; 73/304 C; 307/246

[56] References Cited
UNITED STATES PATENTS
3,243,701   3/1966   Strand ............................ 324/60 CD OTHER PUBLICATIONS
Publication "Pulse, Digital and Switching Waveforms," Millman Taub., Aug. 1967, pp. 706–713.

*Primary Examiner*—Richard C. Queisser
*Assistant Examiner*—Daniel M. Yasich
*Attorney, Agent, or Firm*—Bargfrede and Thompson

[57] ABSTRACT

Apparatus is disclosed for remotely responding to the capacitance of a capacitor, such as a capacitor probe being used to measure the level of water in a well. The capacitor is charged by a source of charging voltage through a shielded conductor and a diode provided at or near to a terminal connecting the conductor and the capacitor so that the capacitor may be charged independently of the conductor and source of charging voltage. The capacitor is discharged by a read out device through a second shielded conductor and a resistor provided at or near to a terminal connecting the second conductor and the capacitor.

5 Claims, 5 Drawing Figures

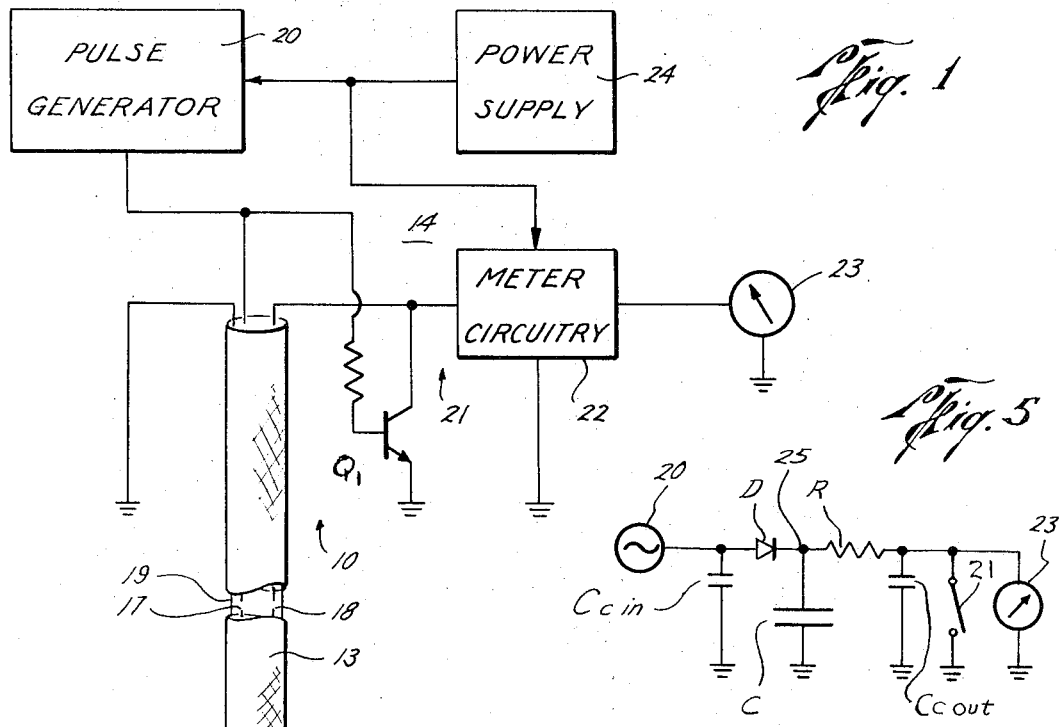
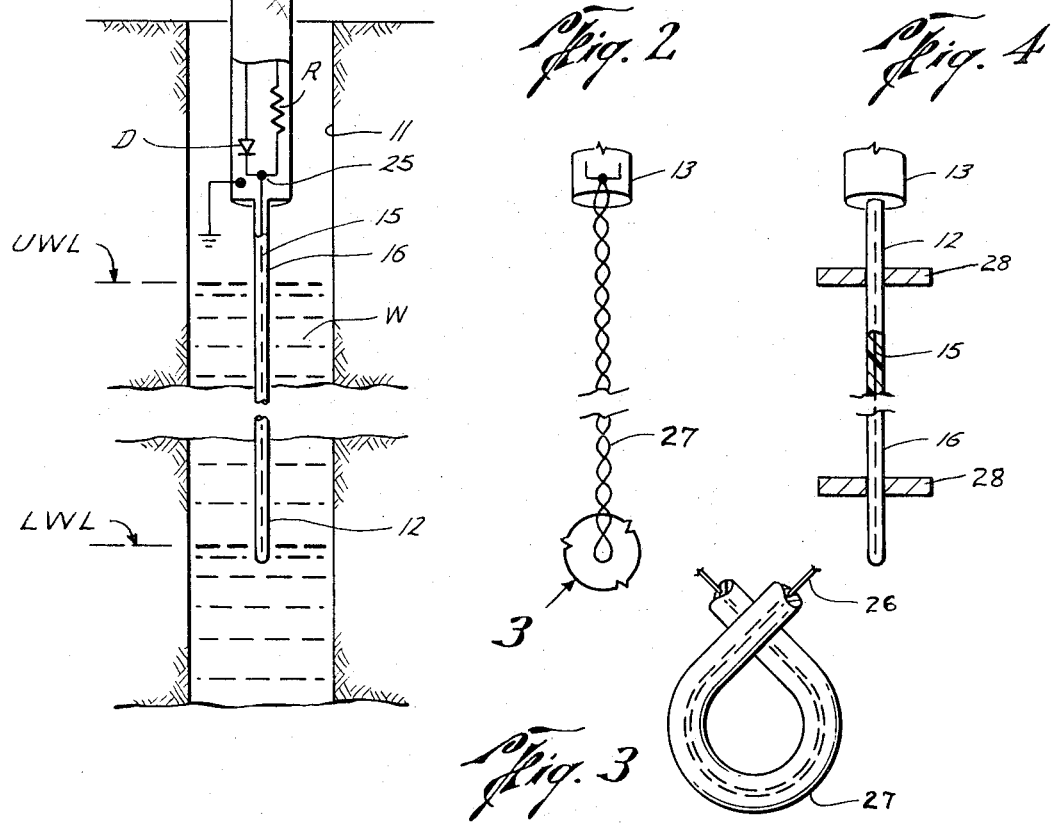

CAPACITANCE SENSING APPARATUS

This invention relates to a capacitance sensing apparatus and in one of its aspects to such apparatus for remotely sensing or measuring the charge on a capacitor. In another aspect, this invention relates to an apparatus for remotely measuring the level of water in a water well.

There are many applications where it is known to use capacitance, or a change in capacitance to measure a condition. For example, liquid measuring apparatus have been suggested in the prior art which measure changes in liquid level by the change in capacitance of a capacitor probe immersed in the liquid. In all of these applications, it is desirable to measure the capacitance of the probe or other capacitor at some remote point from the probe, and this must be generally done through shielded cables. In the past, because of the inherent difficulty of just measuring the capacitance of the probe, and relatively small changes in the capacitance through long cables having inherent capacitances sometimes larger than the capacitances being measured, relatively complicated capacitance or impedance bridges, or differential or compensating capacitors have been used. In some cases, it has been necessary to mount the electronics close to the probe which may be in a hostile environment. In so far as is known to applicant, the prior art has not provided apparatus for remotely measuring capacitance through large lengths of conducting cable, without the need of relatively complex electronics or relatively complex construction of a capacitor probe. The primary object of this invention is to provide such an apparatus.

Another object of this invention is to provide such a device that is particularly adaptable to permit remote measurement of the liquid level in a well, such as a water well.

In providing a probe for use in a deep well, particularly where long lengths of the probe are required it is undesirable to use probes that require more than one conductive element, or concentric elements, because of the cost involved. Also, the longer the probe is the more difficult it is to orient in the well with respect to the walls of the well and a probe is required that is relatively insensitive to its orientation in the well. Therefore, a further object of this invention is to provide improved probes having a single conductive element for use in such a liquid level sensing device, and substantially meeting the requirements stated.

These and other objects of this invention, which will be apparent upon consideration of the attached drawings and claims, and the following detailed specification, are accomplished by providing lengths of conductors for connecting a capacitor or probe, the capacitance of which is to be measured, to remotely located charging and read out electronics. The conductors may be conductors in a single shielded cable which includes two inner conductors. One conductor is provided for conducting periodic charging voltages to the capacitor, and the other conductor is provide as a discharge path for discharging the capacitor through the read out electronics. The conductors terminate at or near the end of the cable and are connected to a terminal (which may be no more than a solder joint) connected to the capacitor or probe, the capacitance of which is to be measured. Isolation means, such as a diode, is provided in the charging conductor near the referenced terminal, for blocking the flow of current from the terminal to the charging electronics. A resistor is preferably connected in the discharge conductor, at or near the referenced terminal and in series with the discharge of the capacitor or probe. Gate means may be provided between the source of charging voltages and the read out means for inhibiting the operation of the read out means during periods of charge of said capacitor or probe by said charging voltages.

The capacitance to be measured may be that of a single conductive probe element immersed in the water of a well, with a dielectric about the probe element so that the capacitance between the probe element and surrounding water (which changes with a change in level) is measured. The single probe element may be connected to the conducting cable at or near the terminal to which the drive and discharge conductors, and their series diode and resistor are connected. The cable, terminal, diode, resistor, and probe can all be formed as an integrated cable-probe assembly for permanent installation in a water well.

The single element probe can be formed of insulated twisted wire, or of insulated straight wire with spacers about it to keep it spaced from the well casing to permit free flow of water about it, so that its orientation with respect to the walls of the well are of relatively little concern.

In the drawings, wherein like numerals are used throughout to designate like parts, and wherein preferred embodiments of this invention are illustrated:

FIG. 1 is a partial schematic view and a partial view in elevation of a water well level indication system utilizing the principles of this invention.

FIG. 2 is a view in elevation of one form of capacitance probe for use in the level indication system of FIG. 1;

FIG. 3 is an enlarged view taken at 3 in FIG. 2,

FIG. 4 is a view in elevation of another form of capacitance probe for use in the level indication system of FIG. 1, and FIG. 5 is an equivalent circuit of the system of FIG. 1.

Referring now to FIG. 1, a water level indicating system 10, is shown for indicating the level of water W in a water well 11 (which level will vary during normal usage between a lower water line LWL and an upper water line UWL). System 10 includes a capacitor probe 12 connected by a conductive cable 13 to charging and read out electronics 14. In actual use, probe 12 would normally be permanently installed between the well pipe and well casing (not shown). Also, while the system of FIG. 1 is illustrated in connection with a probe for indicating water level, it is to be understood that probe 12 could be an element of any capacitor the capacitance of which is to be remotely measured or sensed, and that the principles of this invention and its features would be applicable.

As shown in FIG. 1, probe 12 includes a single conductive element or wire 15, which is surrounded by an insulating dielectric 16 which insulates element 15 from water W. Thus, since water W is effectively at ground potential, and is separated from element 15 by dielectric 16, a capacitor having capacitance C to ground is formed between element 15 and water W. The length of element 15 is such that when water W varies between levels LWL and UWL during normal usage, it will be immersed in the water. By way of example, probe 12 may be 100' in length and may be located several hundred to several thousand feet below the earth's surface Cable 13 may be a standard shielded cable having an outer layer of non-hydroscopic insulating material, such as polyethylene, two inner conductors 17 and 18, and a conductive, grounded shield 19 about the conductors 17 and 18. Cable 13 may be any suitable length for connecting probe 12 to electronics 19. As shown in FIG. 1, inner conductor 17 is connected at its end opposite well 11 to a source of periodic charging voltages, shown as a pulse generator 20, and inner conductor 18 is connected at its end opposite well 11 to an indicating means or read out electronics which includes a gate circuit 21, meter circuitry 22, and a meter 23. A conventional power supply 24 is illustrated for supplying power to the electronics.

At the other end of cable 13, which is connected to probe 12, conductors 17 and 18 terminate together at a terminal 25, to which single probe element 15 is also connected. However, a diode D and a resistor R are respectively connected in series with conductors 17 and 18 and are connected together at terminal 25. Diode D functions as an isolation means for preventing the flow of current from probe 12 (or terminal 25) to pulse generator 20, to effectively isolate probe 12, or any other capacitor connected to terminal 25, from the charging source except for the flow of charging current, and from the cable capacitance $C_{cin}$ of conductor 17. On the other hand, resistor R functions as a discharge impedance means and is connected in conductor 18 so that the charge on probe 12 is discharged through resistor R and the cable capacitance $C_{cout}$ of conductor 18 is part of the measuring circuit, but on the other side of the resistor R from capacitance C of probe 12. The equivalent circuit of FIG. 5 illustrates this relationship. By providing the connection of Diode d and resistor R at a terminal 25 at or near the end of cable 13, the measuring or discharge part of the circuit (probe 12, and conductor 18) can be charged independently of the charge part of the circuit, and remote sensing of the capacitance of probe 12 can be easily provided without special circuits or compensating capacitors.

Pulse generator 20 may be a conventional pulse generator providing, for example, output pulses 1 millisecond in width, 100 volts in amplitude, and at a repetition rate of a 100 pulses per second. Gate 21 includes a transistor $Q_1$ shunting meter circuitry 22, and the discharge path of probe 12 to ground so that when transistor $Q_1$ conducts capacitance C is discharged through transistor $Q_1$ and not meter 23. The base of transistor $Q_1$ is connected to the output of pulse generator 20 through a resistor so that when the output of pulse generator 20 is high, transistor $Q_1$ is conducting and meter 23 is clamped so that it will not register charging current. Between pulses from pulse generator 20, transistor $Q_1$ shuts off and capacitance C is discharged through meter 23, which registers the discharge current or a value proportional thereto, and proportional to the capacitance C.

A potentiometer (not shown) may be provided in meter circuitry 22 for zero setting meter 23 when probe 12 is installed with zero indicating the level LWL or other desired level.

When the apparatus of this invention is utilized to detect water level in a water well (or other liquid level), in order to permit water to fully surround the probe, the construction of the probe in FIGS. 2 and 3 may be used. This reduces the effect of the variations in capacitance created the capacitance between the conductive element of the probe and the well pipe is much less should the probe or a portion thereof contact the well pipe. The variations result because than the capacitance between the element and the ground through the surrounding water. Such variation could reduce the sensitivity of the apparatus to water level changes. In FIGS. 2 and 3, a single insulated wire 26 may be doubled back and twisted to provide probe 27. With even this construction if the probe lies against the well pipe, the small portion of the probe in contact with the pipe will not affect the sensitivity of the probe appreciably. Therefore, with this configuration a long probe can be inserted in a well without concern as to whether or not it is centered between the casing and the center pipe of the well.

Alternatively, as shown in FIG. 4, spacers 28 may be provided at suitable points along the length of probe 12 to keep it off an adjacent wall.

As is evident from the above description, by utilization of this invention, a simple, single wire probe which can be of great lengths can be connected by relatively long lengths of cable to simple charging and read out electronics, and a reliable and accurate indication of the capacitance of the probe, or other capacitor, can be provided. This is particularly important since by use of this invention, a water level indicator can be provided which, because of its simplicity and relatvely low cost, can be permanently installed in a water well to continuously monitor the level of water in the well. Also, if desired, circuitry (not shown) can be readily provided by those skilled in the art which automatically stops a pump when the water level falls below a certain level, as indicated by the reading on meter 23.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth (or shown in the accompanying drawings) is to be interpreted as illustrative and not in a limiting sense.

The invention having been described, what is claimed is:

1. Apparatus for remotely measuring the capacitance of a capacitor having first and second spaced elements with a dielectric therebetween and said second element connected to ground comprising, in combination, a first conductor electrically connected to said first element of the capacitor, a pulsating direct current voltage source means electrically connected to the first element through the first conductor for periodically charging the first element through the first conductor, said first conductor including isolation means located adjacent the first element to prevent the charge on the first element from flowing from the first element through the first conductor to the charging means, a second conductor electrically connected to the first element to provide a path through which the charge on the element can be discharged during the periods between charges from the charging means, impedance means located in the second conductor to retard the rate of discharge of the element between charging periods from the voltage source, and enabling means responsive to the discharge of the first element through the second conductor and impedance means to register the discharge current and to indicate the capacitance of the capacitor as a function thereof.

2. The apparatus of claim 1 in which the impedance means is a resistor.

3. The apparatus of claim 1 further provided with means for effectively disconnecting the indicating means from the second conductor while the first element is being charged.

4. The apparatus of claim 3 in which the disconnecting means comprises gate means actuated by the charging voltage to connect the second conductor to ground and divert the flow of current in the second conductor from the indicating means while a charging voltage is being applied to the first element.

5. The apparatus of claim 1 in which the isolation means is a diode arranged to prevent the flow of current from the first element to the voltage source.

* * * * *